No printed specification available
9851X
D. Variel.
Churn.
Patented Jul. 1, 1836.
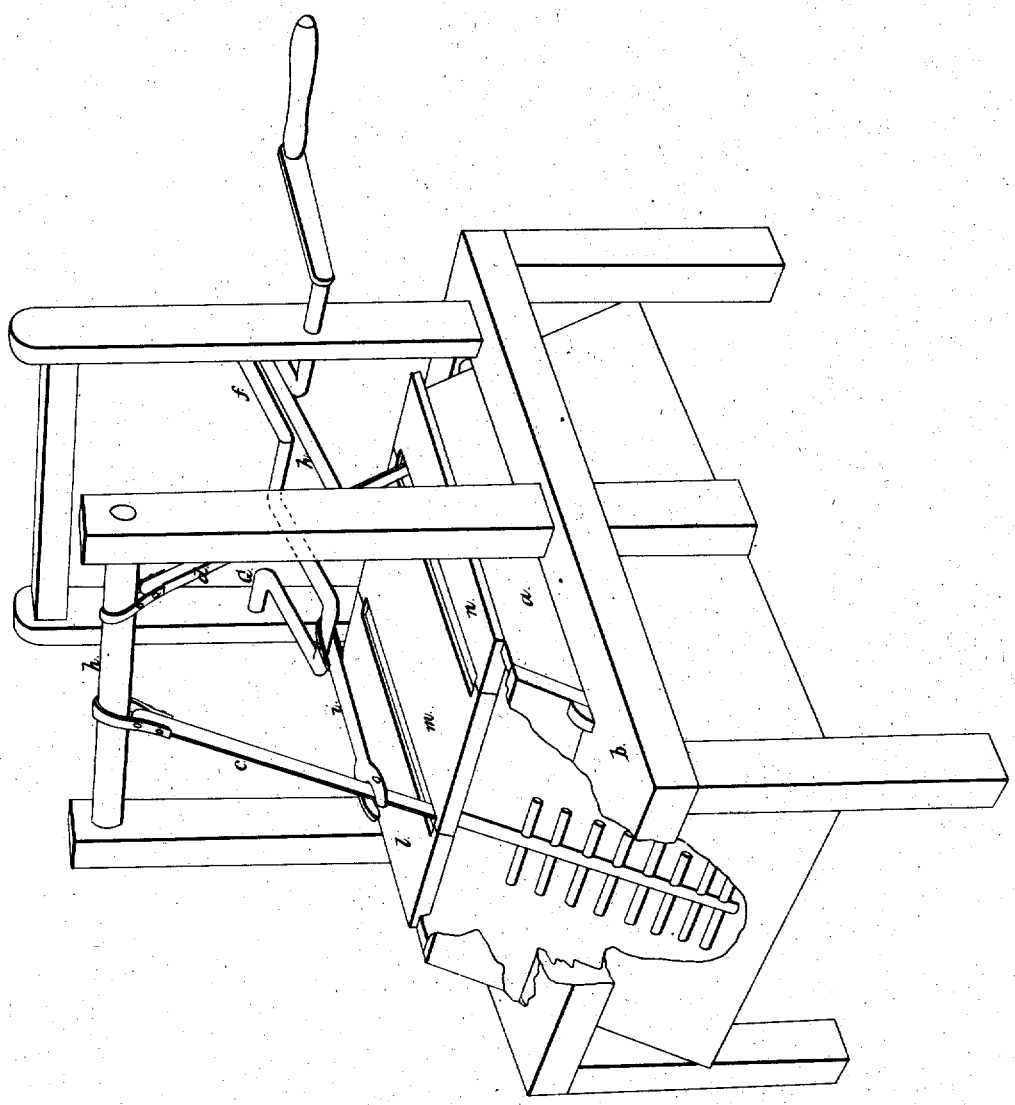

Davis Carick

Letters Patent.

The schedule referred to in these Letters Patent and making part of the same containing a description in the words of the said Davis Carick himself of his Improvement in the Machine for churning Butter.

To all to whom these presents shall come:
Be it known that I Davis Carrick of Minot in the County of Cumberland and State of Maine, have invented a new and useful improvement in a Machine for churning butter from milk and cream and that the following is a full and exact description thereof. I make a box eighteen inches high; ten inches square at the top and ten by sixteen at the bottom. The box is halved together at the corners and a one inch plank bottom put in in the same manner one inch and a half thick. A rabbit is made on the inside at the top of the box one inch downwards and three eights .. deep so as to admit the cover. The cover is put on in three pieces so as to leave a space between the middle and the two outside ones one inch wide and extending quite across the churn each way. These spaces are left half way from the centre of the box to the inside edge each way. I then make a bench two feet four inches long and thirteen inches wide standing on four legs sixteen inches high from the floor to the top of the bench and one inch and a half square. In one end of this bench is cut a square hole of sufficient size to admit the top of the box far enough to let the legs rest on the floor. Each side of this hole in the edges of the bench and in the centre of the sides of the box opposite each other are set two posts perpendicular twenty inches high and four inches wide at the bottom two

7/11/1836 9851X two at the top and one and a half inches thick. Near the
top of these posts or through them is put a pin three fourths
of an inch in diameter so as to reach through them both—
I then make two breaks or paddles long enough to reach
from this pin to the bottom of the churn on the inside.
The lower end of these breaks below the corner of the box are
set with pins four inches long and one inch wide and three
fourths of an inch thick; and one set as often as it is found
necessary to produce sufficient friction to separate the
butter from the cream— Through the top of these breaks
is left a hole three fourths of an inch in diameter, I then set
them in the box through the spaces in the corner and put through
the holes in the top of the brakes the before mentioned pin, leaving
the brakes at liberty to pass fore and aft free from the bottom of the
box— On the bench fourteen inches from the centre of the box
and opposite each other. I put two posts in which I place a
double iron crank long enough at one end to project over the side
of the bench when the handle is put on.— The extremities of the crank
in the centre are opposite each other; from each extremity of the
crank there is fitted an arm fourteen inches long so as to reach
the breaks; they are then put into the brakes so as to form a
joint— then by turning the crank the brakes pass by each other
in an opposite direction and thus the machine is put in
motion. This machine may be built of pine or hard wood at
pleasure. What I claim as my invention and not previously
known in the above described machine is the fitting the bench and box
together; the corner as it now is in the pieces, and the hanging the brakes
over the corner by which means they are made to touch the inside of
the box at the bottom and top on each side Witnesses
[illegible] John Graham }
[illegible] Richard S. Downing }

David [illegible]

[illegible]